United States Patent [19]

Marcin et al.

[11] Patent Number: 6,158,957
[45] Date of Patent: Dec. 12, 2000

[54] THERMAL BARRIER REMOVAL PROCESS

[75] Inventors: John J. Marcin; Stephen D. Murray, both of Marlborough; Keith D. Sheffler, Wethersfield, all of Conn.

[73] Assignee: United Technologies Corporation, Hartford, Conn.

[21] Appl. No.: 09/221,293

[22] Filed: Dec. 23, 1998

[51] Int. Cl.⁷ .................................................. B08B 3/10
[52] U.S. Cl. ..................... 415/200; 416/241 R; 134/26
[58] Field of Search ................ 415/200; 416/241 R, 416/241 A; 134/16, 26, 29

[56] References Cited

U.S. PATENT DOCUMENTS

| | | | |
|---|---|---|---|
| 5,145,355 | 9/1992 | Poinsot et al. ............................... | 431/1 |
| 5,263,325 | 11/1993 | McVey et al. .............................. | 60/738 |
| 5,349,811 | 9/1994 | Stickler et al. ......................... | 60/39.06 |
| 5,445,517 | 8/1995 | Kondou et al. ........................... | 431/18 |
| 5,575,144 | 11/1996 | Brough .................................... | 60/39.02 |
| 5,643,474 | 7/1997 | Sangeeta .................................... | 216/96 |
| 5,685,917 | 11/1997 | Sangeeeta .................................... | 134/2 |
| 5,915,452 | 6/1999 | Conroy et al. ........................... | 164/345 |
| 5,976,265 | 11/1999 | Sangeeta et al. ............................ | 134/3 |

FOREIGN PATENT DOCUMENTS 2 239 961   7/1991   United Kingdom .

*Primary Examiner*—F. Daniel Lopez
*Assistant Examiner*—James M McAleenan
*Attorney, Agent, or Firm*—Charles E. Sohl

[57] ABSTRACT

The invention is a process for removing ceramic thermal barrier layers from gas turbine engine hardware. A combination of chemical and mechanical steps are used to remove the thermal barrier coating from the substrate without removing the bond coat from the substrate. The process leaves the bond coat on the substrate in condition to receive a repair ceramic thermal barrier coating. The process includes a caustic solution treatment in an autoclave under controlled conditions followed by a mechanical abrasion process.

20 Claims, No Drawings

THERMAL BARRIER REMOVAL PROCESS

BACKGROUND OF THE INVENTION

Gas turbine engines are widely used to propel aircraft, to generate electricity, and to pump fluids. There is an increasing requirement for higher performance and better fuel economy in such engines. At this point the most readily available approach to increase efficiency and power output is to increase operating temperature. However, many gas turbine engine components currently operate very near their melting points, in fact many gas turbine engine components are internally cooled.

In recent years it has become fairly common to use ceramic insulating coatings on the external (heated) surfaces of gas turbine components, particularly air cooled gas turbine components, to permit operation at higher temperatures.

There is a wide variety of thermal barrier coatings used in gas turbines, they are all ceramic based, and most use yttria stabilized zirconia as the ceramic. Ceramic coatings can be applied by vapor deposition techniques (see for example U.S. Pat. Nos. 4,321,311; 5,238,752 and 5,514,482) or by thermal spray techniques (see for example U.S. Pat. No. 4,861,618).

With limited exceptions, ceramic thermal barrier coatings are applied to substrates which have previously received an intermediate, or bond coat. The bond coat provides enhanced adhesion and durability to the thermal barrier coating. The bond coat also affords a measure of environmental protection in the event that the ceramic thermal barrier coating is damaged in service.

Superalloys are alloys based on iron, nickel or cobalt having useful properties at temperatures in excess of 1,000° F. Nickel superalloys are most widely used and Table I lists several exemplary nickel base superalloys.

TABLE I

| (wt % Exemplary Superalloy Compositions) | | | | | | | | | | | | | |
|---|---|---|---|---|---|---|---|---|---|---|---|---|---|
| | Cr | Co | W | Cb | Ti | Al | B | Hf | C | Ni | Ta | Mo | Zr | Re |
| PWA1422 | 9 | 10 | 12 | 1 | 2 | 5 | .015 | 1.6 | .14 | Bal | — | — | — | — |
| PWA1426 | 6.4 | 12.6 | 6.4 | — | — | 5.9 | 0.012 | 1.5 | — | Bal | 3.0 | 1.7 | .08 | .3 |
| PWA1480 | 10 | 5 | 4 | — | 1.5 | 5 | — | — | — | Bal | 12 | — | — | — |
| IN 792 | 12 | 9 | 3.8 | — | 4.1 | 3.5 | .015 | 0.5 | .12 | Bal | 3.9 | 1.9 | .12 | — |

Two major types of bond coats are used. The first type is the overlay or MCrAlY bond coat. MCrAlY bond coats are alloys of nickel or cobalt combined with chromium aluminum and yttrium. Other minor alloy elements including tantalum, platinum, rhodium, silicon, hafnium, rhenium and others are also possible. In service, the MCrAlY forms an oxide surface layer of relatively pure the alumina.

Table II lists several exemplary MCrMlY compositions.

TABLE II

| (wt % Exemplary MCrAlY Compositions) | | | | | | | |
|---|---|---|---|---|---|---|---|
| | Ni | Co | Cr | Al | Y | Hf | Si |
| NiCrAlY | Bal | — | 19.5 | 12.5 | .45 | — | — |
| CoCrAly | — | Bal | 18 | 11 | .45 | — | — |
| NiCoCrAlY | Bal | 23 | 8 | 12.5 | .3 | — | — |
| NiCoCrAlY | Bal | 22 | 17 | 12.5 | .6 | .25 | .4 |

MCrAlY overlay coatings have typical thicknesses of 75–175μ.

The second type of bond coat is the diffusion aluminide bond coat, which are formed by diffusing aluminum into the surface of the superalloy substrate material to form a surface layer enriched in aluminum to ensure that the surface oxide which forms will be mainly alumina. Typical aluminide coating thicknesses are 30–70μ. A variety of aluminide coatings are known, a principal variant is the platinum aluminide in which a layer of platinum is applied to the substrate surface prior to the diffusion of aluminum. Platinum aluminide coatings have superior properties to normal aluminide coatings in certain applications. See U.S. Pat. No. 5,716,720 for a discussion of Pt aluminides as bond coats.

It is also possible to combine the aluminide and MCrAlY and overlay coatings (see for example U.S. Pat. Nos. 4,897, 315, and 4,005,989).

Both MCrAlY overlay coating and aluminide coatings form an alumina layer of relatively high purity to which the ceramic thermal insulating layer will adhere.

The ceramic layer can be applied using physical vapor deposition techniques or by thermal spray techniques. Regardless of details of the bond coat and the ceramic application, the result is a gas turbine component comprising a superalloy substrate, a bond coat on the substrate, an alumina layer on the bond coat and a ceramic layer adhered to the bond coat.

The thermal barrier coated superalloy turbine component can be expected to survive for thousands of hours in a gas turbine engine with gases at temperatures as high as 2700° F. flowing over the superalloy coated articles at a rate of as much as 1000 feet per second at pressures of as much as 400 psi. It will therefore be appreciated that the thermal barrier coating is durable and well adhered to the substrate.

Regardless of the initial durability, there will come a time in a life of a gas turbine component when repair or refurbishment of the coated part is necessary. It is then necessary to remove the ceramic coating and replace it with a new ceramic coating. Conceptually the ceramic can be removed mechanically or chemically, but the real problem is to remove the ceramic without removing or adversely affecting the bond coat. When the bond coat is removed or is chemically attacked, and has its surface composition altered, it is usually necessary to replace the bond coat, to ensure that the new ceramic coating will be adherent, and have the same durability as the original coating. This is a costly procedure which may not be economical.

Autoclaves are known in the superalloy industry, principally for use in removing ceramic molds and cores from superalloy castings. Shell molds can be 0.1–0.25 inches in thickness and cores may extend 3–6 inches inside coatings.

When used to remove molds and cores, autoclaves are operated with caustic solutions of sodium hydroxide and/or sodium hydroxide at temperatures and pressures which cause aggressive attack and removal of the ceramic shells and cores in reasonable time periods. The emphasis in the prior use of autoclaves to remove shell and core ceramics from superalloys is on aggressive operation to remove large amounts of ceramics in reasonable times. The chemistry and quality of superalloy surfaces after the removal process is of little consequence because shell and core removal occurs early in the blade production process and many other steps will be performed which will shape and size the blade for its final function, and because protective coatings will subsequently be applied.

The prior art has also made some use of autoclaves and caustic solutions for blade cleaning, and for removal of thermal barrier coatings. See for example U.S. Pat. No. 5,685,917. These prior references of ceramic thermal barrier removal have been focused on certain features such as the use of special coolants to produce super critical fluid conditions in the autoclave process. The prior references have apparently not employed mechanical abrasion processing.

Accordingly, it is an object of the invention to disclose the process by which the ceramic portion of the thermal barrier coating can be removed without significantly changing the thickness of the bond coat or the chemical composition of the bond coat.

It is a further object of the invention to describe a thermal barrier coating refurbishment process.

SUMMARY OF THE INVENTION

This invention is directed at a ceramic coating removal process including a wet chemical ceramic removal step under carefully controlled conditions followed by a mild abrasive surface cleaning step. The chemical step process parameters are selected to remove the large majority if not all of the ceramic material without removing or significantly attacking the bond coat. The mechanical abrasion step then removes any remaining ceramic material, which will have been weakened and attacked by the chemical removal step. The mild mechanical abrasion step also removes a thin layer from the surface of the bond coat, a layer of a thickness equal to or greater than the thickness of chemical attack of the bond coat.

According to the present invention a ceramic thermal barrier coating can be completely removed from the gas turbine engine component with a related removal of not more than about 15 microns of the bond coat material. Removal of this small amount of bond coat material has no practical effect on the subsequent functionality of the recoated article.

The wet chemical step of the invention is performed in a autoclave apparatus and uses a caustic chemical solution comprised of sodium hydroxide or potassium hydroxide or mixtures thereof The caustic concentration is correlated with the temperature and pressure conditions in the autoclave to remove the ceramic portion of the thermal barrier coating in an economic amount of time, preferably less than about four hours total cycle time, and preferably less than about one hour at the maximum process temperature.

The consequence of the wet chemical caustic treatment when properly performed are that the majority, preferably more than about 80% on an area basis, of the ceramic thermal barrier coating is removed. Removal generally occurs by spalling of the ceramic material from the bond coat oxide layer. The remaining ceramic material if any, is left in a weakened condition and is easily removed by a subsequent mild mechanical abrasion step.

It has been found that the chief deleterious effect of the wet chemical caustic step on the bond coat is to attack and preferentially remove aluminum from the surface of the bond coat. This can be deleterious to the subsequent use of the part because the surface aluminum content is essential to developing the surface oxide layer which is in turn required to adhere the replacement ceramic thermal barrier coating to the substrate.

The subsequent mechanical abrasion process step removes all residual ceramic, and an amount of the bond coat sufficient to expose a surface of the proper aluminum composition to develop an adherent alumina layer, so that a replacement ceramic coating will adhere to the bond coat.

DESCRIPTION OF THE INVENTION

We employ an autoclave apparatus typical of that use in the industry comprised of a pressure vessel made of corrosion resistant material such as monel, containing a means for heating a liquid and a means for sealing the chamber to permit the buildup of pressure. Using sealed vessel filled with the fluid which is heated will increase the boiling of the fluid in the autoclave as the vapor pressure builds to above atmospheric pressure, and the increased temperature substantially increases the rate of the chemical attack of the caustic on the ceramic coatings on the parts.

Preliminary experiments in which gas turbine components with ceramic thermal barrier coatings were exposed to normal ceramic shell and core removal cycle used to remove the molds and cores (typically 450° F., 50% caustic for 24–48 hours) were completely successful in removing the ceramic thermal barrier coatings, however they also substantially attacked the bond coat reducing its surface aluminum level significantly, to a depth of 30–50 microns. This depth of attack is too great to reliably reuse the original bond coat. Thus the conventional autoclave shell and core removal process cycle is not satisfactory.

After extensive experimentation, process parameters were determined which can remove the ceramic thermal barrier coatings without substantially changing the surface bond coat composition to a deleterious depth. These conditions were combined with an auxiliary mechanical abrasion step provide the desired result, the complete removal of the ceramic thermal barrier coating without substantial change in the thickness and chemistry of the bond coat material.

The temperature and pressure that is used during treatment can be varied, depending on the type of thermal barrier coating to be removed and the characteristics of the autoclave such as heat up and cool down rates.

The autoclave treatment may involve combinations of ultrasonication, mechanical mixing, and boiling (by varying the autoclave pressure).

We use a concentrated caustic solution comprising about 15–50% of weight sodium hydroxide or potassium hydroxide, or mixtures thereof, preferably of about 25–50% by weight, and most preferably to about 35–50% by weight. We prefer to use a maximum operating temperature of from about 290–450° F., preferably from about 325–425° F., and most preferably from about 350–425° F.

We have used what we refer to as a spike procedure in which the parts are placed in the autoclave, the autoclave is sealed and is then heated at the maximum rate possible to be the desired maximum temperature. Once that temperature is achieved the holding time at that maximum temperature is relatively minimal, less than one hour, and preferably less than 20 minutes. For the autoclave which we have used, which we believe is fairly typical of that found in the industry, this permits us to remove the bulk of the ceramic thermal barrier material in a two or three hour cycle, about one hour to heat the autoclave to the desired maximum temperature, a hold at the maximum operating temperature of less to one hour, and a cool down step of approximately one hour duration. The times and other operating conditions will vary slightly from autoclave to autoclave depending on such things as the size and thermal mass of the autoclave and the rate at which the autoclave can be heated to and cooled from the operating temperature.

Thermal barrier coatings are usually applied to turbine parts with internal cooling. The thermal barrier coating is applied to the surface exposed to the hot environment. Cooling air is flowed through passages within the part, in some gas turbine applications cooling air may be as hot as 1,000° F. Because of the use of high temperature cooling air there is a trend to use protective coatings on the inside of the part to reduce internal oxidation by cooling air.

Internal coatings are aluminide coatings. In many applications cooling holes are provided to allow the cooling air to flow through the part wall and to flow over the outside of the part to allow film cooling.

It is necessary to carefully control the wet chemical step to minimize attack of the internal aluminide coatings. Also, it will generally be appropriate to perform a thorough rinsing step after the wet chemical step to remove all caustic from within the blade. Rinse water may be flowed under pressure through the internal cooling passages. Hot water rinses, wetting agents, and agitation may be employed.

Using the previously described ranges of parameters of caustic concentration and temperature, and taking into account autoclave variations, one skilled in the art can readily determine an operating cycle which will remove at least 80% of the ceramic thermal barrier coating while not changing the aluminum content in the bond coat to a depth greater than about $10\mu$ and preferably not more than $5\mu$ in the case of aluminide bond coats. If the part has an MCrAlY bond coat, and does not have an internal aluminide coating, up to about $20\mu$, but preferably not more than $5\mu$ of the bond coat may be depleted of aluminum, because of the greater MCrAlY thickness. If the part has an internal aluminide coating, attack of such internal coating will control the process, and such internal coating attack should not exceed $10\mu$ and preferably $5\mu$.

We have observed that the bond coat is generally attacked locally at first, and that these localized attack sites grow in area. We prefer to operate the chemical removal step to minimize the percentage of bond coat area undergoing localized attack to less than about 20% based on area, preferably not greater than about 3 microns. The portion of the bond whose composition is changed is called the depleted zone. The depletion zone can be defined as the surface region of the bond coat where the original aluminum content has been reduced by more than about 20% from its original level. By way of example, in the case of a bond coat containing 15% Al, we would define the depletion zone as that outer portion of the bond coat containing less than about 13% Al.

Generally, using only a chemical caustic process not all the ceramic thermal barrier coating material can be removed before the bond coat chemistry, (aluminum content) is modified to its depth of more than about 5 microns. The invention relies on chemical attack to remove most of the ceramic without excess bond coat attack, followed by mechanical abrasion to remove the remaining ceramic and any of the bond coat which has been attacked.

The ceramic appears to spall or delaminate at the alumina surface layer on the bond coat. We believe that the caustic attacks the bond coat alumina layer or the interface between the bond coat alumina surface layer and the ceramic layer.

After the autoclave ceramic removal step, the parts are removed from the autoclave, and rinsed and are then subject to a mechanical abrasion step to remove any remaining ceramic material, and to remove that thin surface portion of the bond coat whose chemistry has been modified by the caustic process. We have used mild grit blasting. However we feel it is well within the scope of one skilled in the art to employ other abrasive techniques. For example there are many techniques which are generally referred to as mass media finishing in which parts to be processed are buried in a vibrating or moving bed of large ceramic particles, usually with a fluid added.

EXAMPLE

Turbine blades having an alumina bond coat (30–40 microns thick) and approximately 125 microns of 70% Y stabilized zirconia, applied by vapor deposition, as an insulating coating were chemically stripped under different conditions.

Stripping was performed in an autoclave (pressurized only by the natural vapor pressure of the caustic solution). The caustic solution was a 50% solution by weight of potassium hydroxide in water. Two temperatures and several treatment times were evaluated.

The results are presented in Table III. While there is scatter in the data, due to small sample sizes and probable bond coat variations, some trends are clear. At both temperatures, short times were effective at ceramic removal with minimum bond coat attack. The spike treatment, less than about 10 minutes at temperature was effective at both temperatures.

TABLE III

|   | Temp. | Time | Max Depth of Attack, $\mu$ | Qualitative Aluminum Depletion | Area of Attack | TBC Removal |
|---|---|---|---|---|---|---|
| 1 | 425° F. | Spike | 2.5 | Slight | Isolated | Total |
| 2 | " | 1 hr | 3 | Mild | Nearly cont. | " |
| 3 | " | 2 hr | 6.3 | Moderate | Continuous | " |
| 4 | " | 4 hr | 10 | Moderate | " | " |
| 5 | " | 6 hr | 19 | Severe | " | " |
| 6 | " | 8 hr | 21 | Extremely severe | " | " |
| 7 | " | 24 hr | 24 | " | " | " |
| 8 | " | 48 hr | 26 | " | " | " |
| 9 | 350° F. | Spike | NIL | NIL | NIL | Slight residue left |
| 10 | " | 1 hr | 7 | Moderate | Continuous | Total |
| 11 | " | 2 hr | 6 | Moderate | Nearly cont. | Total |
| 12 | " | 4 hr | 8 | Moderate | Nearly cont. | Total |

Even where total removal of ceramic coating is indicated, there is still a general need for a light abrasion step to remove some of the bond coat, and to remove the chemical smut left by the caustic treatment.

Once the original ceramic layer is removed, a new ceramic layer may be applied to produce a refurbished coated part. The replacement ceramic layer will generally be substantially identical to the original ceramic layer. The bond coat may be treated to provide a desired surface finish and may then be treated to form the alumina surface layer. The details of the bond coat surface preparation, the alumina scale preparation and the placement ceramic will generally be the same as those used to apply the original ceramic thermal barrier layer.

What is claimed is:

1. Method for removal of ceramic thermal barrier coating from a superalloy substrate having a bond coat thereon which comprises:
   a. immersing said ceramic thermal barrier coated substrate in a caustic solution at a pressure in excess of atmospheric and a maximum process temperature in excess of the atmospheric boiling point of said caustic solution for a time sufficient to remove at least 80% of said ceramic thermal barrier coating without changing the chemical composition of the bond coat to a depth of more than about 15 microns,
   b. mechanically abrading the substrate to remove any residual ceramic material and to remove an amount of bond coat material greater or equal to the thickness of the bond coat whose chemical composition may have been changed by the caustic chemical step.

2. A method as in claim 1 wherein the bond coat is an aluminide coating and less than 15 microns of bond coat is chemically changed.

3. A method as in claim 1 wherein the caustic solution comprises an aqueous solution of a material selected from the group consisting of KOH and NaOH and mixtures thereof in an amount of from 15–50% by weight.

4. A method as in claim 3 in which the caustic material is present in an amount of from 25–50% by weight.

5. A method as in claim 3 in which the caustic material is present in an amount of from 35–50% by weight.

6. A method as in claim 1 wherein the maximum temperature of the caustic solution is from about 290–450° F.

7. A method as in claim 1 wherein the maximum temperature of the caustic solution is from about 325–425° F.

8. A method as in claim 1 in which the time at the maximum temperature is less than about 1 hour.

9. A method as in claim 1 in which the time at the maximum temperature is from about 1 minute to about 20 minutes.

10. A method as in claim 1 wherein the maximum depth of chemical change in the bond coat is about 3 microns.

11. A method as in claim 1 wherein the abrasive process is selected from the group consisting of dry grit blasting, wet grit blasting and vibratory mass media finishing.

12. A method for replacing the ceramic portion of a thermal barrier coating on a gas turbine component including the steps of:
    a. immersing said coated substrate in a caustic solution at a pressure in excess of atmospheric and a maximum process temperature in excess of the atmospheric boiling point of said caustic solution for a time sufficient to remove said ceramic coating without changing the chemical composition of the bond coat to a depth of more than about 15 microns;
    b. mechanically abrading the bond substrate to remove any residual ceramic material and to remove an amount of bond coat material greater or equal to the thickness of the bond coat whose chemical composition may have been changed;
    c. Reapplying a ceramic layer.

13. A method as in claim 12 wherein the caustic solution comprises an aqueous solution of a material selected form the group consisting of KOH and NaOH and mixtures thereof in an amount of from 15–50% by weight.

14. A method as in claim 13 in which the caustic material is present in an amount of from 35–50% by weight.

15. A method as in claim 12 wherein the maximum temperature of the caustic solution is from about 290–450° F.

16. A method as in claim 12 in which the time at the maximum temperature is less than about 1 hour.

17. A method as in claim 12 wherein the maximum depth of chemical change in the bond coat is about 3 microns.

18. A method as in claim 12 wherein the abrasive process is selected from the group consisting of dry grit blasting, wet grit blasting and vibratory mass media finishing.

19. A method as in claim 12 wherein the reapplied ceramic layer contains more than about 80% zirconia by weight.

20. A refurbished gas turbine component produced by the method of claim 12.

* * * * *